June 12, 1923.
E. G. McCAULEY
PROPELLER FOR AIRCRAFT
Filed Aug. 13, 1921          3 Sheets-Sheet 1
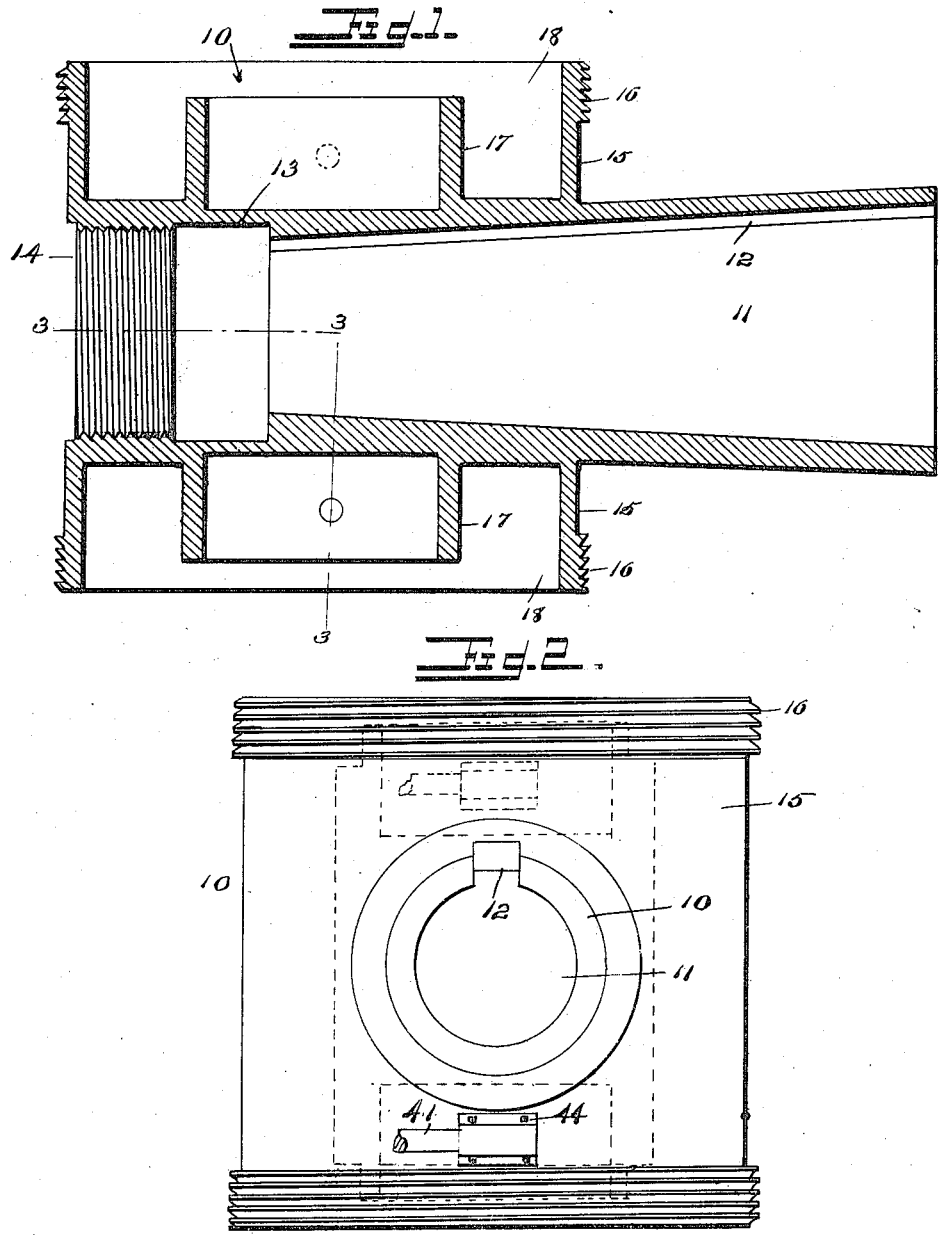

June 12, 1923.
E. G. McCAULEY
PROPELLER FOR AIRCRAFT
Filed Aug. 13, 1921     3 Sheets-Sheet 2
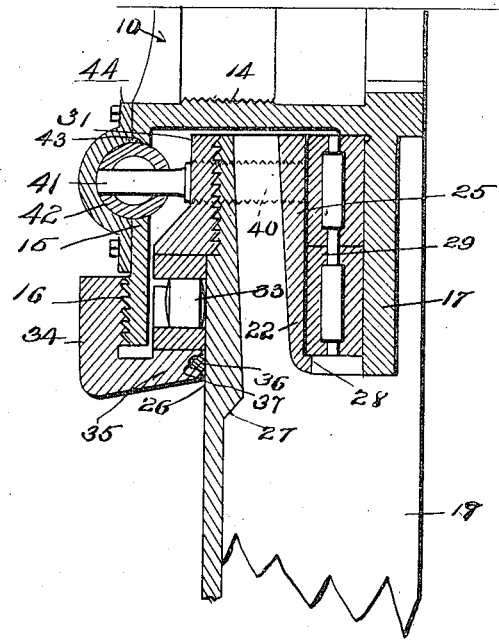
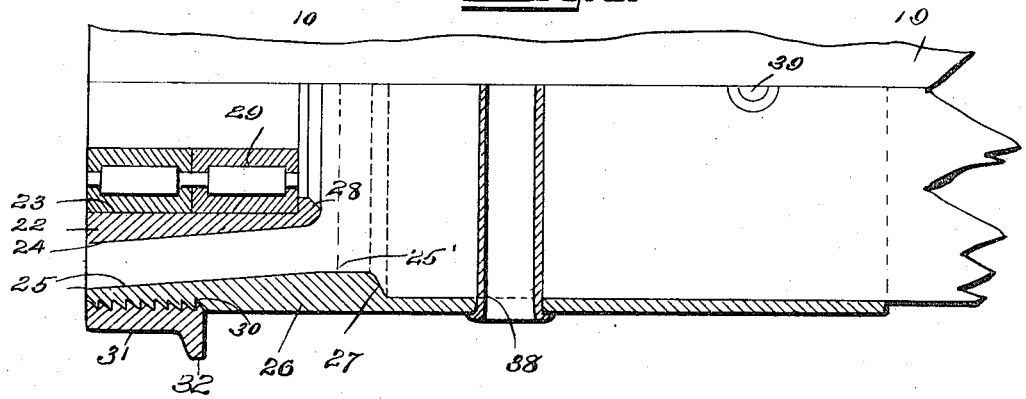

June 12, 1923.
E. G. McCAULEY
PROPELLER FOR AIRCRAFT
Filed Aug. 13, 1921
1,458,213
3 Sheets-Sheet 3
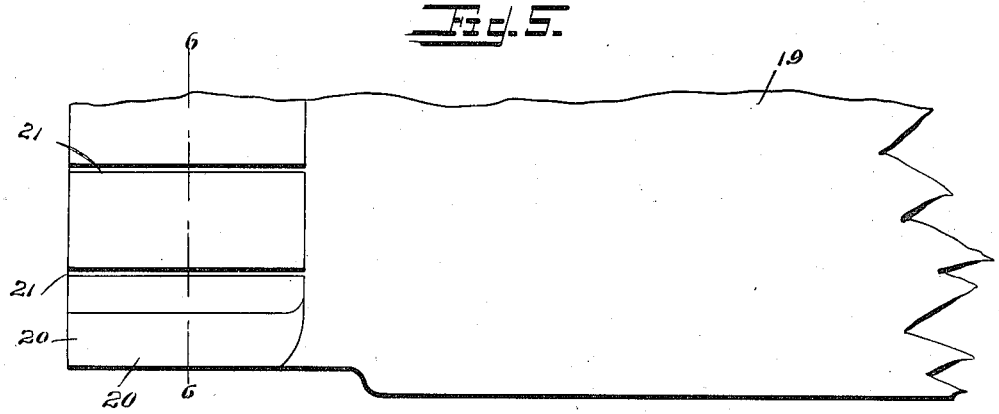
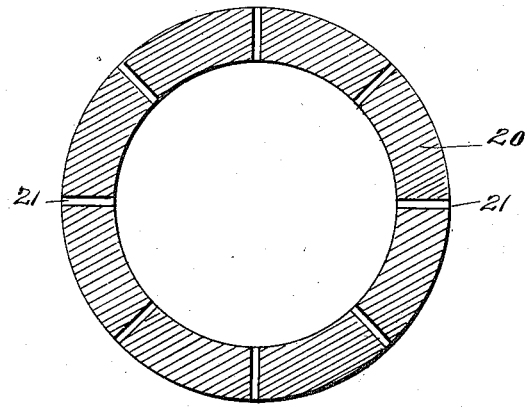
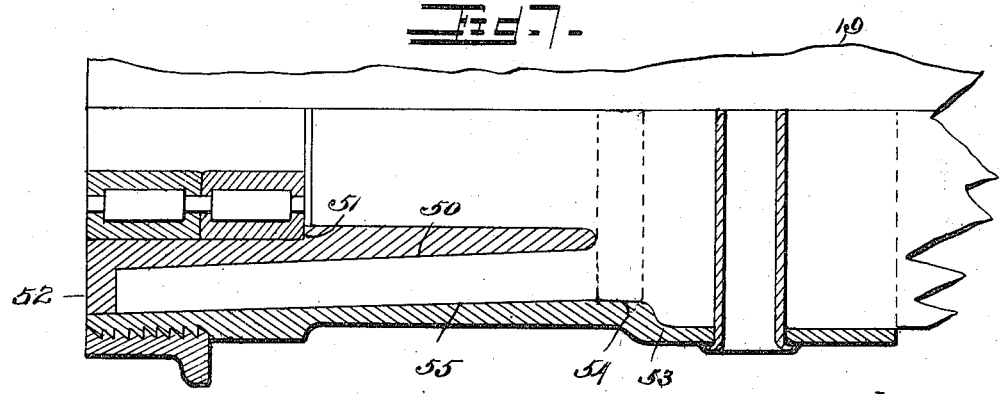
Inventor
E. G. McCauley
By Robert H. Young
Attorney Patented June 12, 1923.

1,458,213

UNITED STATES PATENT OFFICE.

ERNEST G. McCAULEY, OF DAYTON, OHIO.

PROPELLER FOR AIRCRAFT.

Application filed August 13, 1921. Serial No. 491,973.

*To all whom it may concern:*

Be it known that I, ERNEST G. MCCAULEY, a citizen of the United States, residing at Dayton, in the county of Montgomery and State of Ohio, have invented certain new and useful Improvements in Propellers for Aircraft, of which the following is a specification.

This invention relates to a propeller and more particularly to a retaining means for reversible or changeable pitch propeller blades.

An object of my invention is to provide an expanding ring for fastening the wood of the propeller blades into a cylindrical barrel or ferrule in such manner as to utilize the expanding ring as a bearing seat for radial bearings.

Another object of my invention is to provide a detachable thrust bearing collar so as to facilitate assembly and repair of the mechanism.

According to my invention the propeller blades are counterbored or hollowed out at one end and parallel saw cuts are then made in the wood at suitable distances apart. An expanding or tapered ring is applied to the interior of the counterbored portion for the purpose of bending and compressing the wood against the sides of a ferrule and this operation is accomplished without splitting, tearing or shearing the wood.

These and other objects of the invention whereby the blades of a propeller are securely held within a ferrule will become apparent on reference to the subjoined specification which describes the invention in connection with the accompanying drawings.

In the drawings:

Figure 1 is a central vertical section of a propeller hub.

Figure 2 is an end elevation of said hub.

Figure 3 is a sectional view on the line 3—3—3 of Figure 1.

Figure 4 is a sectional view of a propeller blade in assembled relation with the expanding ring and ferrule.

Figure 5 is a sectional view of the lower portion of a propeller showing the counterbore and saw cuts.

Figure 6 is a sectional view on the line 6—6 of Figure 5.

Figure 7 is a sectional view of a slightly modified form of my invention.

The propeller hub designated as a whole at 10 is formed with a tapering opening 11 and keyway 12 by means of which the hub is secured to the driving shaft of the engine. The conical opening 11 terminates short of the forward end of the propeller hub in an enlarged opening 13 adapted to receive a nut (not shown) for retaining the propeller hub upon the driving shaft. At its forward end the hub is formed with a cylindrical opening and is provided with internal threads 14 adapted to receive a lock nut (not shown). The hub 10 is also formed integrally with opposite cylindrical barrels 15 having exterior threads 16 at their outer ends. Hollow cylindrical bosses 17 are formed integrally with the hub and are arranged coaxially and in spaced relation to the cylindrical barrels 15, whereby a cylindrical space 18 is included between the barrel 15 and the cylindrical boss 17 located therein.

The propeller blades 19 are of cylindrical form at their inner ends, as shown at 20. This cylindrical portion is counterbored or hollowed out and the remaining cylindrical wall is cut by a number of longitudinal saw cuts 21. An expanding metallic ring 22 is formed with an inner cylindrical surface 23 and an outer tapered or wedge shaped surface 24. This expanding ring is adapted to be pressed into the counterbored portion 20 for the purpose of bending and compressing the strips of wood between saw cuts 21 against the tapered interior surface 25 of a ferrule 26. The tapered surface 25 is continued beyond the inner end of the expanding ring in a straight surface 25' and is then bevelled outwardly so as to form a shoulder 27 which connects to a surface of the ferrule of larger internal diameter.

The expanding ring is formed at its outer end with an inturned annular flange 28 adapted to act as a stop for a radial roller bearing 29 which is located between inner surface 23 of the expanding ring and the outer surface of the hollow boss 17. The lower end of the ferrule 26 is provided with screw threads 30 upon which a thrust bearing collar 31 is threaded. These screw threads 30 are preferably chased on the ferrule after the expanding ring has been pressed in position. Likewise, the seat 23 of the radial bearing 29 is machined after the expanding ring is in place in order to insure axial alignment with the propeller blade. The collar 31 has an upper annular flange 32 upon which a roller thrust bearing 33 is mounted. This thrust bearing is retained in place by means of an annular collar 34 having internal threads for engaging the screw threads 16 of the cylindrical barrel 15, and also a flange 35 adapted to overlap the thrust bearing 33. The flange 35 is provided with a suitable opening adapted to receive the ferrule 26, and a packing ring 36 inserted in a groove 37 formed on the inner edge of said flange is adapted to bear against the ferrule for the purpose of retaining lubricant in the thrust bearing 33. Dowel pins 38 and 39 are inserted through the ferrule and propeller blades at points located above the shoulder 27. These dowel pins are preferably inserted at an angle of 45° to the laminations of the wood to help in holding the propeller blades in the ferrule.

For the purpose of changing or reversing the angularity of the propeller blades, the expanding ring 22, the material of the propeller blade, the ferrule 26 and thrust collar 31 are bored in transverse alignment and threaded for receiving a threaded pin 40 having an extension 41 which projects through transverse openings formed in a slidable rod 42. It will be understood that the rod 42 and pin 40 are duplicated on opposite sides of the cylindrical barrel 15, the latter being formed with arcuate recesses 43 adapted to cooperate with detachable bearing plates 44 for slidably supporting said rods. The rods 42 are adapted to be actuated from the cockpit of the airplane through suitable and well known mechanism (not shown).

In applying the expanding ring to counterbored portions of the propeller blades, the hub ends of the propeller blades may be submerged in water or other suitable solution, or treated by steam in order to soften the wood before the expanding ring is inserted. While the thrust bearing collar 31 is shown on one end of the ferrule 26, it will be understood that this collar may be applied to any position on the outer length of the ferrule.

The expanding ring bends and compresses the wood of the propeller blades against the sides of the ferrule and, owing to the saw cuts, any tendency of the wood to split, tear or shear during this operation is avoided. The thrust bearings 33 take the thrust due to centrifugal force and transmit the same directly to the cylindrical barrel 15 by means of the flanged collar 34. Radial bearings 29 permit easy adjustment of the angularity of the propeller blades and transmit lateral thrust directly to the hollow boss 17. A further important feature of this invention is that the detachable collars 34 permit the propeller blades to be readily disassembled from the hub 10 for the purpose of replacing or repairing the parts of the mechanism.

In Figure 7 I have illustrated a modified form of the invention in which the expanding ring 50 is made somewhat longer than the ring shown in Figure 4. The ring in this form is provided with an intermediate shoulder 51 adapted to abut against the radial bearing. The expanding ring 50 also differs from the ring 22 in having an annular flange 52 which acts to prevent the wood from becoming compressed beyond the initial compression due to the pressing of the expanding ring into place. This annular flange 52 also keeps the expanding ring in axial alignment with the ferrule so as to provide a true bearing seat for the radial bearings. The ferrule is enlarged in diameter at the shoulder 53 in order to provide for a larger propeller. The ferrule is also formed with a straight surface 54 parallel to the axis of the propeller. This surface 54 is located slightly beyond the end of the expanding ring and connects the shoulder 53 with the tapered surface 55. The function of this straight surface 54 is similar to the function of the corresponding surface 25' of the first form of my invention, as it allows the wood to bend without breaking or tearing of the grain. Otherwise the modified form shown in Figure 7 is similar in construction to Figure 1.

It is evident that those skilled in the art to which this invention appertains may vary the construction as well as the arrangement of parts without departing from the spirit of the invention, and therefore I do not wish to be limited to the above disclosure except as may be required by the claims.

I claim:

1. In a propeller, the combination with a blade thereof having a counterbored portion, of a ferrule, and an expanding ring adapted to be inserted in said counterbored portion for bending and compressing the material of the propeller blade against said ferrule.

2. In a propeller, the combination with a blade thereof having a counterbored portion, of a ferrule, and means adapted to be inserted in said counterbored portion for bending and compressing the material of the propeller blade against said ferrule.

3. In a propeller, the combination with a blade thereof having a counterbored portion formed with a number of cuts providing a series of strips, of a ferrule, and an expanding ring adapted to be inserted in said counterbored portion for bending and compressing said strips against said ferrule.

4. In a propeller, the combination with a blade thereof, of a ferrule having a tapered bore at one end, a ring having a tapered outer surface and a cylindrical inner surface, said tapered surface being adapted to bend and compress the material of the propeller blade against the tapered surface of said bore, and a radial bearing for engaging the inner cylindrical surface of said ring.

5. In a propeller, the combination with a blade thereof, of a ferrule having a tapered bore at one end extending from a relatively large diameter inwardly to a straight surface of smaller diameter, and a ring having a tapered surface adapted to bend and compress the material of the propeller blade against the tapered surface of said bore, said ring being adapted to extend inwardly to the vicinity of said straight surface for preventing the breaking or tearing of the grain of the wood.

6. In a propeller, the combination with a blade thereof, of a ferrule, an expanding ring adapted to bend and compress the material of said blade against the ferrule, said ring having an inner cylindrical surface terminating in a flange, and a bearing adapted to engage said surface and abut against said flange.

7. In a propeller, the combination with a blade thereof having a counterbored portion, of a ferrule, an expanding ring adapted to be inserted in said counterbored portion for bending and compressing the material of the propeller blade against said ferrule, and dowel pins extending through said blade and ferrule at points located beyond said counterbored portion.

8. In a propeller, the combination with a blade thereof, of a ferrule, an expanding ring for bending and compressing the wood of said blade against said ferrule, and dowel pins extending through said propeller blade and ferrule having the outer ends thereof riveted over against the outer surface of said ferrule, said dowel pins being located at 90° with respect to each other and extending through the blade at an angle of approximately 45° with the grain of the wood.

9. In combination, a propeller hub having a cylindrical barrel and a cylindrical boss integral therewith and in spaced relation, a propeller blade, a ferrule for said blade, an expanding ring for retaining said blade within said ferrule, a radial bearing between said boss and ring, a flanged collar detachably connected to said ferrule, a thrust bearing mounted on said collar, and means detachably connected to said barrel for retaining said thrust bearing in position.

In testimony whereof I have affixed my signature.

ERNEST G. McCAULEY.